US010763673B2

(12) United States Patent
Ogier et al.

(10) Patent No.: US 10,763,673 B2
(45) Date of Patent: Sep. 1, 2020

(54) METHODS AND SYSTEMS FOR CONTROLLING SUPPLY OF POWER GENERATED BY A WEATHER DEPENDENT POWER GENERATOR

(71) Applicant: South East Water Corporation, Frankston, Victoria (AU)

(72) Inventors: Rohan Ogier, Frankston (AU); Paul Pastulovic, Frankston (AU); Eamon Casey, Frankston (AU)

(73) Assignee: SOUTH EAST WATER CORPORATION, Frankston, Victoria (AU)

( * ) Notice: Subject to any disclaimer, the term of this patent is extended or adjusted under 35 U.S.C. 154(b) by 34 days.

(21) Appl. No.: 16/073,321

(22) PCT Filed: Jan. 25, 2017

(86) PCT No.: PCT/AU2017/050058
§ 371 (c)(1),
(2) Date: Jul. 26, 2018

(87) PCT Pub. No.: WO2017/127889
PCT Pub. Date: Aug. 3, 2017

(65) Prior Publication Data
US 2019/0067947 A1 Feb. 28, 2019

(30) Foreign Application Priority Data
Jan. 27, 2016 (AU) .............................. 2016900237

(51) Int. Cl.
*H02J 3/38* (2006.01)
*E03F 5/22* (2006.01)
(Continued)

(52) U.S. Cl.
CPC ............... *H02J 3/382* (2013.01); *E03F 5/10* (2013.01); *E03F 5/22* (2013.01); *E03F 7/00* (2013.01);
(Continued)

(58) Field of Classification Search
CPC ....... E03F 5/10; E03F 5/22; E03F 7/00; F04B 2207/00; F04B 23/02; F04B 23/021;
(Continued)

(56) References Cited

U.S. PATENT DOCUMENTS 6,378,554 B1    4/2002   Struthers
7,274,975 B2    9/2007   Miller
(Continued)

FOREIGN PATENT DOCUMENTS

CN    101418787 A    4/2009
CN    104264771 A    1/2015
(Continued)

*Primary Examiner* — Chad G Erdman
(74) *Attorney, Agent, or Firm* — Foley & Lardner LLP

(57) ABSTRACT

A pressure sewer control system includes a server in communication with one or more pressure sewer installations across a communications network, each of the one or more pressure sewer installations including a controller and one or more sewerage tanks. The server is configured to: determine weather data for a region associated with the pressure sewer installation; estimate power generating capability of a weather-dependent power generator based on the weather data; receive fluid level data indicative of a fluid level in the one or more sewerage tanks from the controller; determine whether a pump action should be instigated by the controller to pump fluid from the sewage tank based on the estimated power generating capability of the weather-dependent power generator and the fluid level data; and transmit a pump control instruction to the controller.

14 Claims, 6 Drawing Sheets

(51) Int. Cl.
*H02J 3/32* (2006.01)
*G05D 16/20* (2006.01)
*H02J 13/00* (2006.01)
*H02J 7/34* (2006.01)
*E03F 7/00* (2006.01)
*H02J 3/00* (2006.01)
*E03F 5/10* (2006.01)
*F04B 23/02* (2006.01)
*F04B 49/06* (2006.01)
*H02J 3/14* (2006.01)
*H02J 7/35* (2006.01)

(52) U.S. Cl.
CPC ............ *F04B 23/02* (2013.01); *F04B 23/021* (2013.01); *F04B 49/065* (2013.01); *G05D 16/2006* (2013.01); *G05D 16/2066* (2013.01); *H02J 3/00* (2013.01); *H02J 3/14* (2013.01); *H02J 3/32* (2013.01); *H02J 7/34* (2013.01); *H02J 7/35* (2013.01); *H02J 13/0017* (2013.01); *H02J 13/0086* (2013.01); *F04B 2207/00* (2013.01); *H02J 3/003* (2020.01); *H02J 2203/20* (2020.01); *H02J 2310/14* (2020.01); *Y02E 60/76* (2013.01); *Y02E 70/30* (2013.01); *Y04S 40/22* (2013.01)

(58) Field of Classification Search
CPC .............. F04B 49/065; G05D 16/2006; G05D 16/2066; H02J 13/0017; H02J 13/0086; H02J 2003/003; H02J 2003/007; H02J 2003/143; H02J 3/00; H02J 3/14; H02J 3/32; H02J 3/382; H02J 7/34; H02J 7/35; Y02E 60/76; Y02E 70/30; Y04S 40/22
See application file for complete search history.

(56) References Cited

U.S. PATENT DOCUMENTS

| | | |
|---|---|---|
| 8,983,667 B2 | 3/2015 | Smaidris |
| 2002/0109592 A1* | 8/2002 | Capano .................. G05B 15/02 340/540 |
| 2011/0111700 A1* | 5/2011 | Hackett .................. A01G 25/16 455/41.2 |
| 2012/0222994 A1* | 9/2012 | Smaidris .................. C02F 1/008 210/97 |
| 2013/0243614 A1 | 9/2013 | Leonard et al. |
| 2015/0108839 A1 | 4/2015 | Annavajjhala et al. |
| 2016/0041019 A1* | 2/2016 | Hannon ................ G01F 15/063 702/45 |
| 2016/0115675 A1* | 4/2016 | Quigley .................. E03B 1/042 700/282 |
| 2018/0131188 A1* | 5/2018 | Metcalfe ................ H02J 3/1878 |

FOREIGN PATENT DOCUMENTS

| | | | | |
|---|---|---|---|---|
| CN | 105022419 A | 11/2015 | | |
| CN | 105178387 A | 12/2015 | | |
| CN | 105247144 A | 1/2016 | | |
| JP | S56-075987 A | 6/1981 | | |
| JP | 2008-086109 A | 4/2008 | | |
| JP | 2013-031271 A | 2/2013 | | |
| JP | 2013158730 A | * | 8/2013 | ............ G05B 13/02 |
| KR | 2015-0124325 A | 11/2015 | | |
| TW | 200709529 A | 3/2007 | | |
| WO | WO-2015-035444 A1 | 3/2015 | | |

* cited by examiner

METHODS AND SYSTEMS FOR CONTROLLING SUPPLY OF POWER GENERATED BY A WEATHER DEPENDENT POWER GENERATOR

CROSS-REFERENCE TO RELATED APPLICATIONS

The present application is the U.S. National Stage of International Application PCT/AU2017/050058, filed Jan. 25, 2017, and claims priority to Australian Patent Application No. 2016900237, filed Jan. 27, 2016.

TECHNICAL FIELD

Described embodiments relate to methods and systems for controlling supply of power generated by a weather dependent power generator. Some embodiments relate to a pressure sewer control system and methods of controlling supply of power at one or more pressure sewer installations implementable by the pressure sewer control system. Some embodiments relate to a control unit of a pressure sewer installation and methods of controlling supply of power at the pressure sewer installation implementable by the control unit. Some embodiments relate to methods and systems of controlling supply of power generated by a weather dependent power generator at pressure sewer installations. Some embodiments relate to methods and systems of controlling supply of power generated by a weather dependent power generator to one or more appliances or electrically powered devices.

BACKGROUND

Pressure sewer systems are generally installed in locations where gravity cannot be adequately relied on as the impetus for transporting waste fluid within a reticulated sewer network. Pressure sewer systems involve the use of a fluid reservoir, such as a tank, buried in the ground to receive sewerage from a dwelling or building and rely on a pump within the fluid reservoir to pump fluid out of the reservoir and into a reticulated sewer network comprising fluid conduits to transport the sewerage to a suitable processing station.

Pressure sewer systems often include a reservoir control system for determining when the pump should be activated based on outputs from fluid level sensors provided in the fluid reservoir and generally rely on an electricity supply to be available to power the pump. This restricts pump availability in areas of unreliable supply or deficient electricity capacity in the electricity supply network and can lead to an undesirable overflow and/or leakage of sewerage from the fluid reservoir.

The traditional solution for unreliable electricity supply is to construct civil works to store fluid until electricity supply returns and pumps can restart. This requires large areas of land to be set aside or large tanks to be constructed to manage current and future fluid storage requirements. In effect, unreliable electricity supply is offset by oversized storage of fluids.

It is desired to address or ameliorate one or more shortcomings of traditional solutions for unreliable electricity supply, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a pressure sewer control system comprising a server in communication with one or more pressure sewer installations across a communications network, each of the one or more pressure sewer installations comprising a controller and one or more sewerage tanks, the server configured to: determine weather data for a region associated with the pressure sewer installation; estimate power generating capability of a weather-dependent power generator of the pressure sewer installation for a time period based on the weather data; receive fluid level data indicative of a fluid level in the one or more sewerage tanks from the controller; determine whether a pump action should be instigated by the controller to pump fluid from the sewage tank based on the estimated power generating capability of the weather-dependent power generator and the fluid level data; and transmit a pump control instruction to the controller to cause the controller to activate the pump in response to determining that a pump action should be instigated by the controller.

For example, the weather data may comprise past, current and/or forecasted weather information.

In some embodiments, the server may be configured to determine whether a pump action should be instigated by the controller to pump fluid from the sewage tank further based on pressure sewer installation data. For example, the pressure sewer installation data may comprises one or more of a capacity of the sewerage tank; capacity of a battery associated with the weather-dependent power generator; potential energy harnessing capabilities of the weather-dependent power generator; sewerage tank usage history; sewerage tank filling history; current sewerage tank volume; current power stored in a battery associated with the weather-dependent power generator; electrically powered device usage history; and system health.

In some embodiments, the server may be configured to determine whether a pump action should be instigated by the controller to pump fluid from the sewage tank further based on at least one or more of the following pump action determination criteria: a typical fluid inflow profile of the sewerage tank; a predicted most likely time that the sewerage tank reaches its functional capacity and requires pumping; a predicted most likely time that the sewerage tank reaches a critical capacity that will cause overflow or spill if not pumped; available downstream capacity of a sewer network to receive and accept the pumped fluid; available power generation capacity of the weather-dependent power generator; available battery capacity of a battery associated with the weather-dependent power generator; determined surplus/shortfall of power generation capacity of the weather-dependent power generator; determined surplus/shortfall of battery stored capacity; and predicted power demand of appliances or third party devices.

In some embodiments, the server may be configured to transmit an alarm message to a computing device associated with an operator in response to determining that a pump action cannot be instigated by the controller.

In some embodiments, the server may be configured to determine that a pump action should not be instigated by the controller in response to determining that the estimated power generating capability exceeds a power threshold and that the sewerage tank is not substantially full. In some embodiments, the server may be configured to determine that a pump action should be instigated by the controller in response to determining that the estimated power generating capability exceeds a power threshold and that the sewerage tank is substantially full.

In some embodiments, the server may be configured to determine that a pump action should be instigated by the controller in response to determining that the estimated power generating capability does not exceed a power threshold.

In some embodiments, the server may be further configured to receive local sewerage collection system data associated with one or more local sewerage collection systems from one or more control units associated with the local sewerage collection systems, wherein the local sewerage collection system data comprises available capacity of one or more fluid reservoirs of the local sewerage collection system, and wherein the server is configured to determine whether a pump action should be instigated by the controller to pump fluid from the sewage tank further based on the available capacity of the local sewerage collection systems. The server may be configured to determine that a pump action should be instigated by the controller in response to determining that the available capacity of the local sewerage collection system is greater than a local sewerage collection system capacity threshold.

In some embodiments, the server may be configured to determine that a pump action should be instigated by the controller in response to determining that the estimated power generating capability exceeds a power threshold, that the sewerage tank is substantially full, and the available capacity of the local sewerage collection system is greater than a local sewerage collection system capacity threshold. In some embodiments, the server may be configured to determine that a pump action should be instigated by the controller in response to determining that the estimated power generating capability does not exceed a power threshold and that the available capacity of the local sewerage collection system is greater than a local sewerage collection system capacity threshold.

In some embodiments, the server may be further configured to receive regional sewerage collection system data associated with one or more regional sewerage collection systems from one or more control units associated with the regional sewerage collection systems, wherein the regional sewerage collection system data comprises available capacity of one or more fluid reservoirs of the regional sewerage collection system, and wherein the server is configured to determine whether a pump action should be instigated by the controller to pump fluid from the sewage tank further based on the available capacity of the regional sewerage collection systems. The server may be configured to transmit a pump control instruction to the control unit of the local sewerage collection system to discharge at least some of the fluid held in the local sewerage collection system in response to determining that the available capacity of the regional sewerage collection system exceeds a capacity threshold regional sewerage collection system.

Some embodiments relate to a pressure sewer control system comprising a server in communication with one or more pressure sewer installations across a communications network, each of the one or more pressure sewer installations comprising a controller and one or more electrically powered devices, the server configured to: determine weather data for a region associated with the pressure sewer installation; estimate power generating capability of a weather-dependent power generator of the pressure sewer installation for a time period based on the weather data; determine whether power should be made available to at least one of the one or more electrically powered devices based on the estimated power generating capability of the weather-dependent power generator; and transmit a power control instruction to the controller to cause the controller to supply power generated by the weather-dependent power generator to the at least one of the one or more electrically powered devices in response to determining that power should be made available to at least one of the one or more electrically powered devices.

Some embodiments relate to a control system comprising a server in communication across a communications network with one or more control units for controlling supply of power generated by a weather dependent power generator to one or more electrically powered devices, the server configured to: determine weather data for a region associated with the weather dependent power generator; estimate power generating capability of the weather-dependent power generator for a time period based on the weather data; determine whether power should be made available to the one or more electrically powered devices based on the estimated power generating capability of the weather-dependent power generator; and transmit a control instruction to a controller of the control unit to cause the controller to supply power generated by the weather-dependent power generator to the one or more electrically powered devices in response to determining that power should be made available to the one or more electrically powered devices.

For example, the weather data may comprise past, current and/or forecasted weather information.

In some embodiments, the server may be configured to determine whether power should be made available to one or more electrically powered devices further based on data received from the controller of the control unit. For example, the data may comprise one or more of a capacity of a battery associated with the weather-dependent power generator, potential energy harnessing capabilities of the weather-dependent power generator, electrically powered device usage history, current power stored in a battery associated with the weather-dependent power generator, available power generation capacity of the weather-dependent power generator; available battery capacity of a battery associated with the weather-dependent power generator; determined surplus/shortfall of power generation capacity of the weather-dependent power generator; determined surplus/shortfall of battery stored capacity; predicted power demand of appliances or third party devices; and system health.

In some embodiments, the server may be configured to determine that power should be made available to the one or more electrically powered devices in response to determining that the estimated power generating capability exceeds a power threshold.

In some embodiments, at least one of the one or more electrically powered devices may comprise a control mechanism for controlling the discharge of fluid from a reservoir and wherein the server may be configured to: receive fluid level data indicative of a fluid level in the reservoirs; determine whether power should be supplied to the control mechanism to cause fluid to be discharged from the reservoir based on the estimated power generating capability of the weather-dependent power generator and the fluid level data; and transmit a control instruction to the controller to cause the controller to allow power generated by the weather-dependent power generator to be supplied to the control mechanism of the reservoir in response to determining that a power should be supplied to the control mechanism.

Some embodiments relate to a control unit for a pressure sewer installation comprising at least one sewerage tank, a pump for pumping fluid from the at least one sewerage tank and a weather-dependent power generator for providing power to the pump, the control unit comprising: a controller configured to control activation of the pump by controlling the supply of power to the pump; and a transceiver for allowing the controller to communicate with a remote server across a communications network; wherein the controller is configured to: receive weather data for a region associated with the pressure sewer installation; estimate power generating capability of the weather-dependent power generator for a time period based on the weather data; determine a fluid level of the at least one sewerage tank; and determine whether or not to activate the pump based on the estimated power generating capability of the weather-dependent power generator and the fluid level of the at least one sewerage tank.

For example, the weather data may comprise past, current and/or forecasted weather information.

In some embodiments, the controller may be configured to determine whether the pump should be activated further based on pressure sewer installation data. For example, the pressure sewer installation data may comprises one or more of a capacity of the sewerage tank; capacity of a battery associated with the weather-dependent power generator; potential energy harnessing capabilities of the weather-dependent power generator; sewerage tank usage history; sewerage tank filling history; current sewerage tank volume; current power stored in a battery associated with the weather-dependent power generator electrically powered device usage history; and system health.

In some embodiments, the controller may be configured to determine whether to activate the pump based on at least one or more of the following pump action determination criteria: a typical fluid inflow profile of the sewerage tank; a predicted most likely time that the sewerage tank reaches its functional capacity and requires pumping; a predicted most likely time that the sewerage tank reaches a critical capacity that will cause overflow or spill if not pumped; available downstream capacity of a sewer network to receive and accept the pumped fluid; available power generation capacity of the weather-dependent power generator; available battery capacity of a battery associated with the weather-dependent power generator; determined surplus/shortfall of power generation capacity of the weather-dependent power generator; determined surplus/shortfall of battery stored capacity; and predicted power demand of appliances or third party devices.

In some embodiments, the controller may be configured to transmit an alarm message to a computing device associated with an operator in response to determining that the pump cannot be activated.

In some embodiments, the controller may be configured to determine that the pump should not be activated in response to determining that the estimated power generating capability exceeds a power threshold and that the sewerage tank is not substantially full. In some embodiments, the controller may be configured to determine that the pump should be activated in response to determining that the estimated power generating capability exceeds a power threshold and that the sewerage tank is substantially full. In some embodiments, the controller may be configured to determine that the pump should be activated in response to determining that the estimated power generating capability does not exceed a power threshold.

In some embodiments, the controller may be configured to receive local sewerage collection system data associated with one or more local sewerage collection systems from one or more control units associated with the local sewerage collection systems, wherein the local sewerage collection system data comprises available capacity of one or more fluid reservoirs of the local sewerage collection system, and wherein the controller is configured to determine whether to activate the pump further based on the available capacity of the local sewerage collection system. The controller may be configured to determine that the pump should be activated in response to determining that the available capacity of the local sewerage collection system is greater than a local sewerage collection system capacity threshold. In some embodiments, the controller may be configured to determine that the pump should be activated in response to determining that the estimated power generating capability exceeds a power threshold, that the sewerage tank is substantially full, and the available capacity of the local sewerage collection system is greater than a local sewerage collection system capacity threshold. In some embodiments, the controller may configured to determine that the pump should be activated in response to determining that the estimated power generating capability does not exceed a threshold and that the available capacity of the local sewerage collection system is greater than a local sewerage collection system capacity threshold.

In some embodiments, the controller may be configured to receive regional sewerage collection system data associated with one or more regional sewerage collection systems from one or more control units associated with the regional sewerage collection systems, wherein the regional sewerage collection system data comprises available capacity of one or more fluid reservoirs of the regional sewerage collection system, and wherein the controller is configured to determine whether to activate the pump further based on the available capacity of the regional sewerage collection system. The controller may be configured to transmit a pump control instruction to the control unit of the local sewerage collection system to discharge at least some of the fluid held in the local sewerage collection system in response to determining that the available capacity of the regional sewerage collection system exceeds a capacity threshold regional sewerage collection system.

Some embodiments relate to a control unit for a pressure sewer installation comprising one or more electrically powered devices, the control unit comprising: a controller configured to control the supply of power generated by a weather-dependent power generator of the pressure sewer installation; and a transceiver for allowing the controller to communicate with a remote server across a communications network; wherein the controller is configured to: receive weather data for a region associated with the pressure sewer installation via the transceiver; estimate power generating capability of the weather-dependent power generator of the pressure sewer installation for a time period based on the weather data; determine whether power should be made available to at least one of the one or more electrically powered devices based on the estimated power generating capability of the weather-dependent power generator; and supply power generated by the weather-dependent power generator to the at least one of the one or more electrically powered devices in response to determining that power should be made available to at least one of the one or more electrically powered devices.

In some embodiments, the pressure sewer installation may comprise at least one sewerage tank and the at least one of the one or more electrically powered devices comprises a pump provided in the at least one sewerage tank.

Some embodiments relate to a control unit for controlling supply of power generated by a weather dependent power generator to one or more electrically powered devices, the control unit comprising: a controller configured to control the supply of power generated by the weather-dependent power generator; and a transceiver for allowing the controller to communicate with a remote server across a communications network; wherein the controller is configured to: receive weather data for a region associated with the weather dependent power generator via the transceiver; estimate power generating capability of the weather-dependent power generator for a time period based on the weather data; determine whether power should be made available to the one or more electrically powered devices based on the estimated power generating capability of the weather-dependent power generator; and allow power generated by the weather-dependent power generator to be supplied to the one or more electrically powered devices in response to determining that power should be made available to the one or more electrically powered devices.

For example, the weather data may comprise past, current and/or forecasted weather information.

In some embodiments, the controller may be configured to determine whether power should be made available to one or more electrically powered devices further based on one or more of: a capacity of a battery associated with the weather-dependent power generator, potential energy harnessing capabilities of the weather-dependent power generator, electrically powered device usage history, current power stored in a battery associated with the weather-dependent power generator, available power generation capacity of the weather-dependent power generator; available battery capacity of a battery associated with the weather-dependent power generator; determined surplus/shortfall of power generation capacity of the weather-dependent power generator; determined surplus/shortfall of battery stored capacity; predicted power demand of appliances or third party devices; and system health.

In some embodiments, the controller may be configured to determine that power should be made available to the one or more electrically powered devices in response to determining that the estimated power generating capability exceeds a power threshold.

In some embodiments, at least one of the one or more electrically powered devices may comprise a control mechanism for controlling the discharge of fluid from a reservoir and wherein the controller configured to: determine a fluid level in the reservoirs; determine whether power should be supplied to the control mechanism to cause fluid to be discharged from the reservoir based on the estimated power generating capability of the weather-dependent power generator and the fluid level; and allow power generated by the weather-dependent power generator to be supplied to the control mechanism of the reservoir in response to determining that a power should be supplied to the control mechanism.

Some embodiments relate to a control unit for a pressure sewer installation comprising at least one sewerage tank, a pump provided in the at least one sewerage tank and a weather-dependent power generator for providing power to the pump, the control unit comprising: a controller configured to control the pump for pumping fluid from the at least one sewerage tank; and a transceiver for allowing the controller to communicate with a remote server across a communications network; wherein the controller is configured to: transmit, to the remote server, an indication of the fluid level of the at least one sewerage tank and an indication of energy stored in a battery associated with the weather-dependent power generator; receive, from the remote server, pump control instructions, wherein the pump control instructions are based on the fluid level, the energy stored in the battery and an estimated power generating capability of the weather-dependent power generator for a period.

Some embodiments relate to a control unit for controlling supply of power generated by a weather dependent power generator to one or more electrically powered devices, the control unit comprising: a controller configured to allow or disallow power generated by the weather dependent power generator to be supplied to the electrically powered devices; and a transceiver for allowing the controller to communicate with a remote server across a communications network; wherein the controller is configured to: transmit, to the remote server, an indication of energy stored in a battery associated with the weather-dependent power generator; receive, from the remote server, control instructions to allow or disallow a supply of power to the one or more electrically powered devices, wherein the control instructions are based on the energy stored in the battery and an estimated power generating capability of the weather-dependent power generator for a period.

Some embodiments relate to a pressure sewer installation comprising at least one fluid reservoir; a pump provided in the at least one fluid reservoir; a weather-dependent power generator for providing power to the pump; and a control unit of any of the embodiments described above.

In some embodiments, the pressure sewer installation may further comprise a battery configured for charging by the weather-dependent power generator and configured to provide power to the pump. The weather-dependent power generator may comprise at least one of: (i) one or more solar panels, (ii) one or more wind turbines; and (iii) one or more hydro turbines.

Some embodiments relate to a method of controlling supply of power generated by a weather dependent power generator at a pressure sewer installation, the method operable by a pressure sewer control system comprising a server in communication with one or more pressure sewer installations across a communications network, each of the one or more pressure sewer installations comprising a controller and one or more sewerage tanks, the method comprising: determining weather data for a region associated with the pressure sewer installation; estimating power generating capability of the weather-dependent power generator of the pressure sewer installation for a time period based on the weather data; receiving fluid level data indicative of a fluid level in the one or more sewerage tanks from the controller; determining whether a pump action should be instigated by the controller to pump fluid from the sewage tank based on the estimated power generating capability of the weather-dependent power generator and the fluid level data; and transmitting a pump control instruction to the controller to cause the controller to activate the pump in response to determining that a pump action should be instigated by the controller.

In some embodiments, the method may further comprise transmitting an alarm message to a computing device associated with an operator in response to determining that a pump action cannot be instigated by the controller.

In some embodiments, the method may comprise determining that a pump action should not be instigated by the controller in response to determining that the estimated power generating capability exceeds a power threshold and that the sewerage tank is not substantially full. In some embodiments, the method may comprise determining that a pump action should be instigated by the controller in response to determining that the estimated power generating capability exceeds a power threshold and that the sewerage tank is substantially full. In some embodiments, the method may comprise determining that a pump action should be instigated by the controller in response to determining that the estimated power generating capability does not exceed a power threshold.

In some embodiments, the method may comprise receiving local sewerage collection system data associated with one or more local sewerage collection systems from one or more control units associated with the local sewerage collection systems, wherein the local sewerage collection system data comprises available capacity of one or more fluid reservoirs of the local sewerage collection system, and determining whether a pump action should be instigated by the controller to pump fluid from the sewage tank further based on the available capacity of the local sewerage collection systems. The method may comprise determining that a pump action should be instigated by the controller in response to determining that the available capacity of the local sewerage collection system is greater than a local sewerage collection system capacity threshold. In some embodiments, the method may comprise determining that a pump action should be instigated by the controller in response to determining that the estimated power generating capability exceeds a power threshold, that the sewerage tank is substantially full, and the available capacity of the local sewerage collection system is greater than a local sewerage collection system capacity threshold. In some embodiments, the method may comprise determining that a pump action should be instigated by the controller in response to determining that the estimated power generating capability does not exceed a threshold and that the available capacity of the local sewerage collection system is greater than a local sewerage collection system capacity threshold.

In some embodiments, the method may comprise receiving regional sewerage collection system data associated with one or more regional sewerage collection systems from one or more control units associated with the regional sewerage collection systems, wherein the regional sewerage collection system data comprises available capacity of one or more fluid reservoirs of the regional sewerage collection system, and determining whether a pump action should be instigated by the controller to pump fluid from the sewage tank further based on the available capacity of the regional sewerage collection systems. In some embodiments, the method may comprise transmitting a pump control instruction to the control unit of the local sewerage collection system to discharge at least some of the fluid held in the local sewerage collection system in response to determining that the available capacity of the regional sewerage collection system exceeds a capacity threshold regional sewerage collection system.

Some embodiments relate to method of controlling supply of power generated by a weather dependent power generator at a pressure sewer installation, the method operable by a pressure sewer control system comprising a server in communication with one or more pressure sewer installations across a communications network, each of the one or more pressure sewer installations comprising a controller and one or more electrically powered devices, the method comprising: determining weather data for a region associated with the pressure sewer installation; estimating power generating capability of a weather-dependent power generator of the pressure sewer installation for a time period based on the weather data; determining whether power should be made available to at least one of the one or more electrically powered devices based on the estimated power generating capability of the weather-dependent power generator; and transmitting a power control instruction to the controller to cause the controller to supply power generated by the weather-dependent power generator to the at least one of the one or more electrically powered devices in response to determining that power should be made available to at least one of the one or more electrically powered devices.

Some embodiments relate to a method of controlling supply of power generated by a weather dependent power generator to one or more electrically powered devices, the method operable by a control system comprising a server in communication across a communications network with one or more control units, the method comprising: determining weather data for a region associated with the weather dependent power generator; estimating power generating capability of the weather-dependent power generator for a time period based on the weather data; determining whether power should be made available to one or more electrically powered devices based on the estimated power generating capability of the weather-dependent power generator; and transmitting a control instruction to a controller of the control unit to cause the controller to allow power generated by the weather-dependent power generator to be supplied to the one or more electrically powered devices in response to determining that power should be made available to the one or more electrically powered devices.

For example, the weather data comprises past, current and/or forecasted weather information.

In some embodiments, the method may comprise determining whether power should be made available to one or more electrically powered devices further based on data received from the controller of the control unit. The data may comprises one or more of a capacity of a battery associated with the weather-dependent power generator, potential energy harnessing capabilities of the weather-dependent power generator, electrically powered device usage history, current power stored in a battery associated with the weather-dependent power generator, available power generation capacity of the weather-dependent power generator; available battery capacity of a battery associated with the weather-dependent power generator; determined surplus/shortfall of power generation capacity of the weather-dependent power generator; determined surplus/shortfall of battery stored capacity; predicted power demand of appliances or third party devices; and system health.

In some embodiments, the method may comprise determining that power should be made available to the one or more electrically powered devices in response to determining that the estimated power generating capability exceeds a power threshold.

In some embodiments, at least one of the one or more electrically powered devices may comprise a control mechanism for controlling the discharge of fluid from a reservoir and wherein the server and wherein the method may further comprise receiving fluid level data indicative of a fluid level in the reservoir from the controller; determining whether power should be supplied to the control mechanism to cause fluid to be discharged from the reservoir based on the estimated power generating capability of the weather-dependent power generator and the fluid level data; and transmitting a control instruction to the controller to cause the controller to allow power generated by the weather-dependent power generator to be supplied to the control mechanism of the reservoir in response to determining that a power should be supplied to the control mechanism.

Some embodiments relate to a method of controlling supply of power generated by a weather dependent power generator at a pressure sewer installation comprising at least one sewerage tank, a pump for pumping fluid from the at least one sewerage tank and the weather-dependent power generator for providing power to the pump, the method operable by a control unit of the pressure sewer installation, the method comprising: receiving by a controller of the control unit weather data for a region associated with the pressure sewer installation via a transceiver of the control unit; estimating power generating capability of the weather-dependent power generator for a time period based on the weather data; determining a fluid level of the at least one sewerage tank; and determining whether or not to cause the controller to activate the pump based on the estimated power generating capability of the weather-dependent power generator and the fluid level of the at least one sewerage tank.

For example, the weather data may comprise past, current and/or forecasted weather information.

In some embodiments, the method may comprise determining whether the pump should be activated further based on pressure sewer installation data. The pressure sewer installation data may comprise one or more of a capacity of the sewerage tank; capacity of a battery associated with the weather-dependent power generator; potential energy harnessing capabilities of the weather-dependent power generator; sewerage tank usage history; sewerage tank filling history; current sewerage tank volume; current power stored in a battery associated with the weather-dependent power generator electrically powered device usage history; and system health.

In some embodiments, the method may comprise determining whether to activate the pump based on at least one or more of the following pump action determination criteria: a typical fluid inflow profile of the sewerage tank; a predicted most likely time that the sewerage tank reaches its functional capacity and requires pumping; a predicted most likely time that the sewerage tank reaches a critical capacity that will cause overflow or spill if not pumped; available downstream capacity of a sewer network to receive and accept the pumped fluid; available power generation capacity of the weather-dependent power generator; available battery capacity of a battery associated with the weather-dependent power generator; determined surplus/shortfall of power generation capacity of the weather-dependent power generator; determined surplus/shortfall of battery stored capacity; and predicted power demand of appliances or third party devices.

In some embodiments, the method may comprise transmitting an alarm message to a computing device associated with an operator in response to determining that the pump cannot be activated.

In some embodiments, the method may comprise determining that the pump should not be activated in response to determining that the estimated power generating capability exceeds a power threshold and that the sewerage tank is not substantially full. In some embodiments, the method may comprise determining that the pump should be activated in response to determining that the estimated power generating capability exceeds a power threshold and that the sewerage tank is substantially full. In some embodiments, the method may comprise determining that the pump should be activated in response to determining that the estimated power generating capability does not exceed a power threshold.

In some embodiments, the method may comprise receiving local sewerage collection system data associated with one or more local sewerage collection systems from one or more control units associated with the local sewerage collection systems, wherein the local sewerage collection system data comprises available capacity of one or more fluid reservoirs of the local sewerage collection system, and determining whether to activate the pump further based on the available capacity of the local sewerage collection system. The method may comprise determining that the pump should be activated in response to determining that the available capacity of the local sewerage collection system is greater than a local sewerage collection system capacity threshold. In some embodiments, the method may comprise determining that the pump should be activated in response to determining that the estimated power generating capability exceeds a power threshold, that the sewerage tank is substantially full, and the available capacity of the local sewerage collection system is greater than a local sewerage collection system capacity threshold. In some embodiments, the method may comprise determining that the pump should be activated in response to determining that the estimated power generating capability does not exceed a threshold and that the available capacity of the local sewerage collection system is greater than a local sewerage collection system capacity threshold.

In some embodiments, the method may comprise receiving regional sewerage collection system data associated with one or more regional sewerage collection systems from one or more control units associated with the regional sewerage collection systems, wherein the regional sewerage collection system data comprises available capacity of one or more fluid reservoirs of the regional sewerage collection system, and determining whether to activate the pump further based on the available capacity of the regional sewerage collection system. The method may comprise transmitting a pump control instruction to the control unit of the local sewerage collection system to discharge at least some of the fluid held in the local sewerage collection system in response to determining that the available capacity of the regional sewerage collection system exceeds a capacity threshold regional sewerage collection system.

Some embodiments relate to a method of controlling supply of power generated by a weather dependent power generator at a pressure sewer installation comprising one or more electrically powered devices, the method operable by a control unit of the pressure sewer installation, the method comprising: receiving by a controller of the control unit weather data for a region associated with the pressure sewer installation via a transceiver of the control unit; estimating power generating capability of the weather-dependent power generator of the pressure sewer installation for a time period based on the weather data; determining whether power should be made available to at least one of the one or more electrically powered devices based on the estimated power generating capability of the weather-dependent power generator; and allowing by the controller power generated by the weather-dependent power generator to be supplied to the at least one of the one or more electrically powered devices in response to determining that power should be made available to at least one of the one or more electrically powered devices.

In some embodiments, the pressure sewer installation may comprise at least one sewerage tank and the at least one of the one or more electrically powered devices comprises a pump provided in the at least one sewerage tank.

Some embodiments relate to a method of controlling supply of power generated by a weather dependent power generator to one or more electrically powered devices, the method operable by a control unit, the method comprising: receiving at a controller of the control unit weather data for a region associated with the weather dependent power generator via a transceiver of the control unit; estimating by the controller power generating capability of the weather-dependent power generator for a time period based on the weather data; determining by the controller whether power should be made available to one or more electrically powered devices based on the estimated power generating capability of the weather-dependent power generator; and allowing by the controller power generated by the weather-dependent power generator to be supplied to the one or more electrically powered devices in response to determining that power should be made available to the one or more electrically powered devices.

For example, the weather data comprises past, current and/or forecasted weather information.

In some embodiments, the method may comprise determining whether power should be made available to one or more electrically powered devices further based on one or more of: a capacity of a battery associated with the weather-dependent power generator, potential energy harnessing capabilities of the weather-dependent power generator, electrically powered device usage history, current power stored in a battery associated with the weather-dependent power generator, available power generation capacity of the weather-dependent power generator; available battery capacity of a battery associated with the weather-dependent power generator; determined surplus/shortfall of power generation capacity of the weather-dependent power generator; determined surplus/shortfall of battery stored capacity; predicted power demand of appliances or third party devices; and system health.

In some embodiments, the method may comprise determining that power should be made available to the one or more electrically powered devices in response to determining that the estimated power generating capability exceeds a power threshold.

In some embodiments, at least one of the one or more electrically powered devices may comprise a control mechanism for controlling the discharge of fluid from a reservoir, and the method may comprise determining by the controller a fluid level in the reservoir; determining by the controller whether power should be supplied to the control mechanism to cause fluid to be discharged from the reservoir based on the estimated power generating capability of the weather-dependent power generator and the fluid level; and allowing by the controller power generated by the weather-dependent power generator to be supplied to the control mechanism of the reservoir in response to determining that a power should be supplied to the control mechanism.

Some embodiments relate to a method of controlling supply of power generated by a weather dependent power generator at a pressure sewer installation comprising at least one sewerage tank, a pump provided in the at least one sewerage tank and a weather-dependent power generator for providing power to the pump, the method operable by a control unit of the pressure sewer installation, the method comprising: transmitting by a controller of the control unit an indication of the fluid level of the at least one sewerage tank and an indication of energy stored in the battery, to a remote server via a transceiver of the control unit; receiving by the controller, pump control instructions, from the remote server, via the transceiver, wherein the pump control instructions are based on the fluid level, the energy stored in the battery and an estimated power generating capability of the weather-dependent power generator for a period.

Some embodiments relate to a method of controlling supply of power generated by a weather dependent power generator to one or more electrically powered devices, the method operable by a control unit, the method comprising: transmitting, by a controller of the control unit, an indication of energy stored in a battery associated with the weather-dependent power generator, to a remote server via a transceiver of the control unit; receiving, by the controller from the remote server via the transceiver, control instructions to allow or disallow a supply of power to the one or more electrically powered devices, wherein the control instructions are based on the energy stored in the battery and an estimated power generating capability of the weather-dependent power generator for a period.

BRIEF DESCRIPTION OF DRAWINGS

Embodiments are described in further detail below, by way of example and with reference to the accompanying drawings, in which.

DESCRIPTION OF EMBODIMENTS

Figure 1:
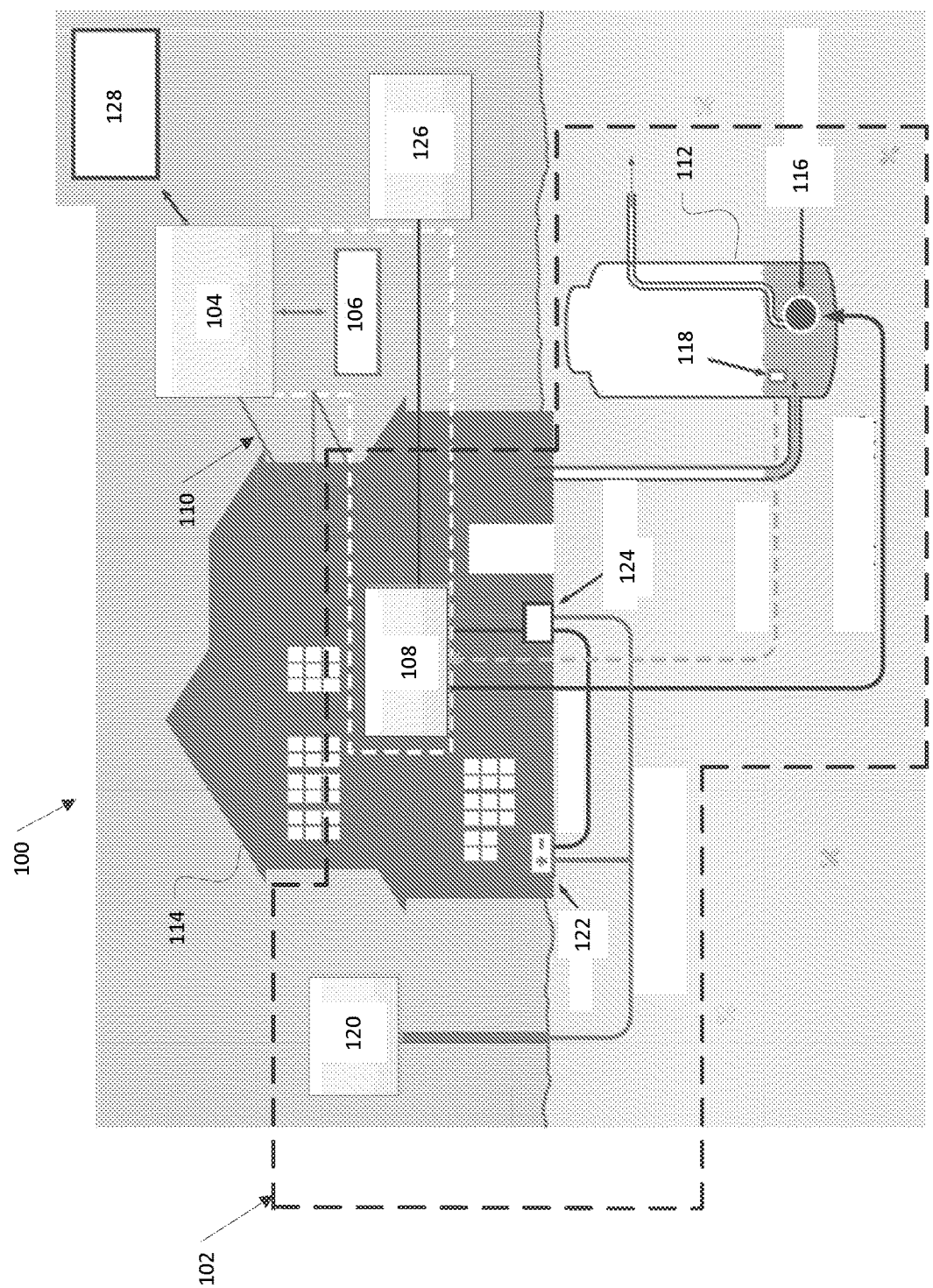
FIG. 1 is a schematic representation of a pressure sewer management system comprising a pressure sewer control system and a pressure sewer installation, according to some embodiments.

Described embodiments relate to methods and systems for controlling supply of power generated by a weather dependent power generator. Some embodiments relate to a pressure sewer control system and methods of controlling supply of power at one or more pressure sewer installations implementable by the pressure sewer control system. Some embodiments relate to a control unit of a pressure sewer installation and methods of controlling supply of power at the pressure sewer installation implementable by the control unit. Some embodiments relate to methods and systems of controlling supply of power generated by a weather dependent power generator at pressure sewer installations. Some embodiments relate to methods and systems of controlling supply of power generated by a weather dependent power generator to one or more appliances or electrically powered devices.

In some embodiments, a control or power management system may be configured to control supply of power at pressure sewer installations of a network of pressure sewer installations. The power management system may be configured to determine instructions for controlling a supply of power generated by a weather-dependent power generator at a pressure sewer installation based on an estimated power generating capability of the weather-dependent power generator for a time period and fluid level data indicative of a fluid level in one or more sewerage tanks of the pressure sewer installation. The estimated power generating capability of the weather-dependent power generator may be based on weather data for a region associated with the pressure sewer installation and/or the weather-dependent power generator. The power management system may issue instructions to a controller of a control unit of the pressure sewer installation to thereby cause the controller to control the supply of power from the weather-dependent power generator and/or a battery configured to store power generated by the weather-dependent power generator to one or more pumps and/or other appliances of the pressure sewer installation.

In some embodiments, a control unit for a pressure sewer installation may be configured to control supply of power at the pressure sewer installation. For example, the pressure sewer installation may comprise at least one sewerage tank, a pump for pumping fluid from the at least one sewerage tank and a weather-dependent power generator for providing power to the pump. The control unit may comprise a controller for estimating a power generating capability of the weather-dependent power generator for a time period based on the weather data associated with the pressure sewer installation and/or the weather-dependent power generator. The controller may control the supply of power from the weather-dependent power generator and/or a battery configured to store power generated by the weather-dependent power generator to the pump to control activation of the pump. The controller may determine whether or not to activate the pump based on the estimated power generating capability of the weather-dependent power generator and the fluid level of the at least one sewerage tank.

In some embodiments, a control or power management system may be configured to control supply of power generated by a weather-dependent power generator to one or more electrically powered devices or appliances. The power management system may be configured to determine instructions for controlling a supply of power generated by a weather-dependent power generator based on an estimated power generating capability of the weather-dependent power generator for a time period. The estimated power generating capability of the weather-dependent power generator may be based on weather data for a region associated with the weather-dependent power generator. The power management system may issue instructions to a controller of a control unit to thereby cause the controller to control the supply of power from the weather-dependent power generator and/or a battery configured to store power generated by the weather-dependent power generator to the one or more electrically powered devices or appliances. In some embodiments, the one or more electrically powered devices may comprise a control mechanism for controlling the discharge of fluid from a reservoir, such as a water tank. For example, the power management system may be configured to determine instructions for controlling a supply of power generated by a weather-dependent power generator to the control mechanism and the instructions for controlling the supply of power may be based on the weather data for the region associated with the weather-dependent power generator and a fluid level of fluid in the reservoir.

In some embodiments, a control unit may be configured to control supply of power generated by a weather-dependent power generator to one or more electrically powered devices or appliances. The control unit may comprise a controller for estimating a power generating capability of the weather-dependent power generator for a time period based on the weather data associated with the weather-dependent power generator, the control unit, and/or the one or more electrically powered devices or appliances. The controller may control the supply of power from the weather-dependent power generator and/or a battery configured to store power generated by the weather-dependent power generator to the one or more electrically powered devices or appliances to control activation of the one or more electrically powered devices or appliances. The controller may determine whether or not to allow power to be supplied to the one or more electrically powered devices or appliances based on the estimated power generating capability of the weather-dependent power generator. In some embodiments, the one or more electrically powered device may comprise a control mechanism for controlling the discharge of fluid from a reservoir, such as a water tank. For example, the control unit may be configured to determine instructions for controlling a supply of power generated by a weather-dependent power generator to the control mechanism and the instructions for controlling the supply of power may be based on the weather data for the region associated with the weather-dependent power generator and a fluid level of fluid in the reservoir.

The described methods and systems for controlling supply of power generated by a weather-dependent power generator may assist in overcoming problems associated with weather-dependent power generators, such as insufficient capacity or expense, to enable the weather-dependent power generators to act as a solution to problems of inadequate or unreliable electricity supply.

Referring to FIG. 1, there is shown a schematic representation of a pressure sewer management system 100. The pressure sewer management system 100 comprises a pressure sewer installation 102 and a control or power management system 104 in communication with a control unit 108 of the pressure sewer installation 102 across a communications network 110. For example, the communications network 110 may comprise wireless telecommunications infrastructure. The control system 104 and/or control unit 108 may also be in communication with a database 106 across the communications network 110.

Figure 3:
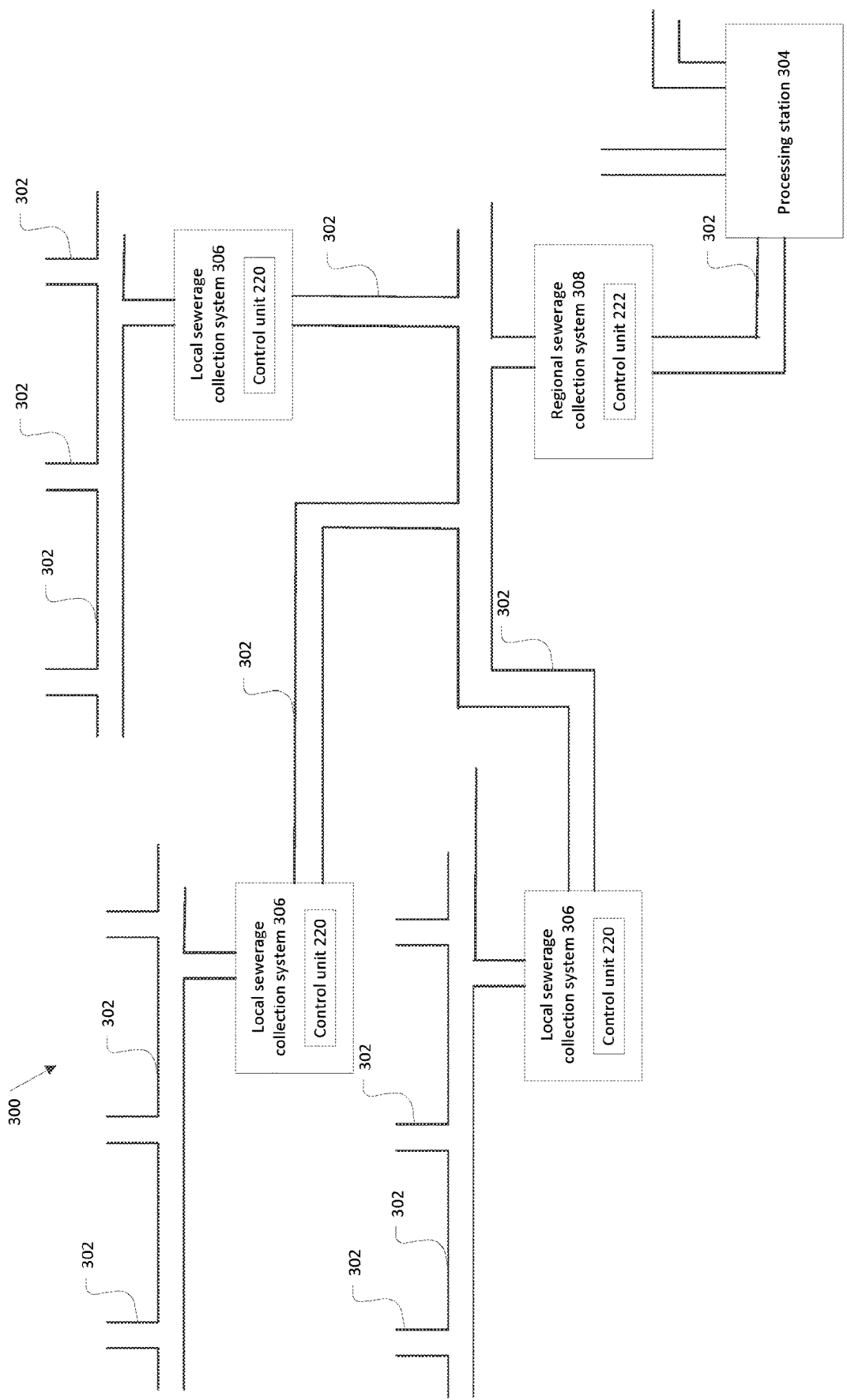
FIG. 3 is a schematic diagram of a reticulated sewer network.

As shown in FIG. 1, the pressure sewer installation 102 comprises at least one fluid reservoir 112, such as a sewerage tank, arranged to receive sewerage from a dwelling, amenities block or building 114. The pressure sewer installation 102 further comprises a pump 116 provided within the fluid reservoir 112 to pump sewerage out of the fluid reservoir 112 and into a reticulated sewer network 300 (FIG. 3) to transport the sewerage to a suitable processing station 304 (FIG. 3).

One or more fluid level sensors (referred to for convenience as "sensor 118") are provided in the fluid reservoir 112 for determining fluid levels of the fluid reservoir 110. The sensor 118 may be arranged to provide signals comprising data indicative of fluid levels in the fluid reservoir 112 to the control unit 108. The sensor 118 may in some embodiments comprise a pressure transducer, for example, and may be arranged to have a sensing head generally submerged below a fluid level in the reservoir 112 in order to obtain a relatively constant and accurate measure of a fluid level within the fluid reservoir 112. In other embodiments, the sensor 118 may comprise an ultra-sonic sensor. In some embodiments, the sensor 118 may comprise a float switch which is capable of transmitting a signal to the control unit 108 when the fluid level in the fluid reservoir 112 reaches a predefined threshold.

The pressure sewer installation 102 further comprises a weather-dependent power generator 120 for providing power to the pump 116. The weather-dependent power generator 120 may configured to harness energy from renewable weather-dependent energy sources such as solar, wind, and wave and may for example comprise at least one of (i) one or more solar panels; ii) one or more wind turbines; and (iii) one or more hydro-turbines.

In some embodiments, the pressure sewer installation 102 further comprises an energy storage device or battery 122. The battery 122 may be connected to the weather-dependent power generator 120 and the weather-dependent power generator 120 may provide generated electricity to the battery 122 for future use. The battery 122 may also be connected to the pump 114 for providing power to the pump 114. In this way the pump 116 may draw power directly from the weather-dependent power generator 120 and/or from the battery 122, i.e., indirectly from weather-dependent power generator 120. The control unit 108 is arranged to control the supply of power from the battery 122 and/or the weather-dependent power generator 120 to the pump 116.

In some embodiments, the weather-dependent power generator 120 and/or battery 122 may also provide power to the control unit 108. For example, an inverter 124 may be provided to convert the DC power supply from the weather-dependent power generator 120 and/or battery 122 to AC power suitable for the control unit 108. In some embodiments, the control unit 108 may be connected to a mains power supply (not shown) and/or a separate battery (not shown).

In some embodiments, the weather-dependent power generator 120 and/or battery 122 may also provide generated electricity to other devices or appliances 126 and/or the grid under control of the control unit 108.

Thus, the pump 116, the control unit 108 and/or appliances 126 may be powered or run independently of the electricity network. In some embodiments, the pump 116, the control unit 108 and/or appliances 126 may be powered or run primarily by power generated by the weather-dependent power generator 120 and, on an as-needed basis, by power generated by a means other than the weather-dependent power generator 120, for example, from the mains power supply (not shown) and/or a separate battery (not shown). Thus, electricity from the mains power supply (not shown) and/or a separate battery (not shown) may serve as a backup power supply.

The control system 104 may also be in communication with a weather forecasting system 128, such as a weather-prediction web service or portal provided by the Bureau of Meteorology or another meteorology information service provider. In some embodiments, the control system 104 may be configured to receive sporadic, periodic or regular weather forecasts from the weather forecasting system 128. For example, the weather forecasting system 128 may provide the control system 104 with weather data for pre-specified or pre-defined geographical areas of interest, such as those geographical areas where pressure sewer installations 102 of interest are located. In some embodiments, the control system 104 may request weather data for those regions or geographical areas where pressure sewer installations 102 of interest are located. The weather data may comprise information relating to sunshine, wind, temperature, rainfall, storms, river flows, etc. and any other suitable weather related data that may affect the power generating capability of the weather-dependent power generator and may be employed in estimating a power generating capability of the weather-dependent power generator for a time period.

Figure 2:
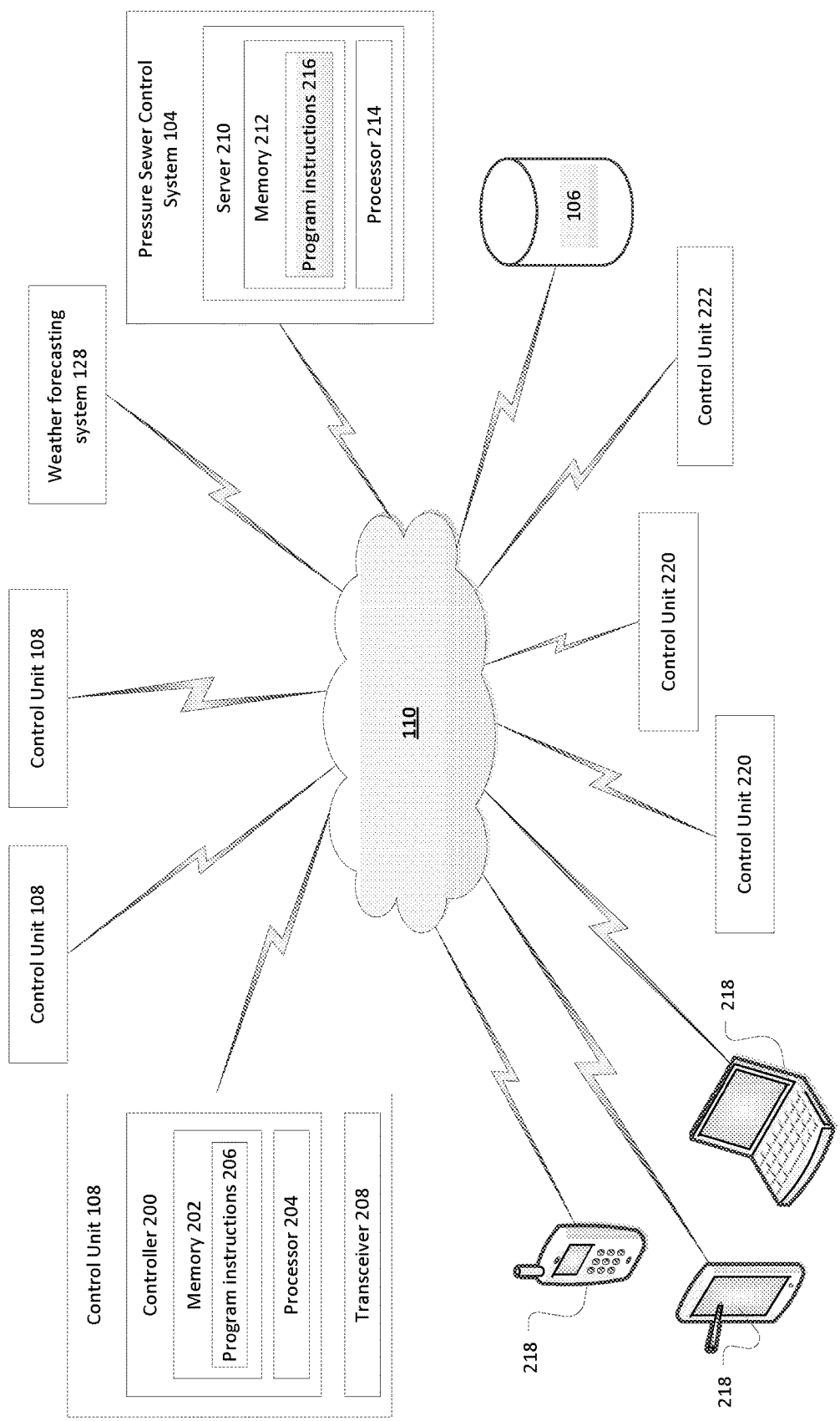
FIG. 2 is a is a schematic representation of a server of the pressure sewer control system of FIG. 1 in communication with a plurality of control units of a plurality of the pressure sewer installations of FIG. 1 across a communications network, according to some embodiments.

Referring to FIG. 2, there is shown the pressure sewer control system 104 in communication with a plurality of control units 108 of pressure sewer installations 102. The control unit 108 comprises a controller 200 for controlling operations of the pump 116. The controller 200 comprises a memory 202 and at least one processor 204 configured to execute program instructions or code 206 stored in the memory 202 to perform the methods disclosed herein. A number of set points and control parameters for operation of the pump 116 may also be stored in the memory 202. A suitable controller 200 is described in International (PCT) Patent Application No. PCT/AU2012/000903, the entire content of which is incorporated herein by reference.

In some embodiments, the pump 116 is configured to operate under control of the controller 200, turning on and off in response to the action of a suitable pump contactor or relay (not shown) that controls the supply of power to the pump 116 from the weather-dependent power generator 120 and/or battery 122.

In some embodiments, the sensor 118 may be configured to provide the controller 200 with a constant (or sufficiently regular as to be effectively constant) measurement of the fluid level within the sewerage tank 112 or a periodic measurement of the fluid level within the sewerage tank 112. The controller 200 may store in its memory 202 measured fluid level data or changes in measured fluid level data. Similarly, other measured parameters or operational statuses may be recorded in the controller's memory 202 when they change and may be time-stamped as of when they occur. In some embodiments, the measured fluid level data or changes in measured fluid level data may be employed to determine whether or not the controller 200 turns on or off the pump 116.

The control unit 108 may further comprise a wireless transceiver unit 208. The controller 200 may be associated with the wireless transceiver unit 208 and may be enabled for two-way communication via the transceiver unit 208 with one or more remote servers 210 of the power management system 104 over the communications network 110, for example, using a standard GSM mobile telephony protocol or a packet routing protocol. The controller 200 may also be enabled for one- or two-way communication with appliances 126 and/or other external devices, such as flow meters or other instruments (not shown), via additional transceiver or receiver units over a low power wireless communication protocol, for example, ZigBee or other IEEE 802.15 protocols, Bluetooth or IEEE 802.11 protocols, or a wired communication protocol. The controller 200 may include or be in the form of a serial communication and data acquisition (SCADA) unit, which effectively functions as a programmable logic controller (PLC). The controller 200 may have a suitable serial data connection with the transceiver unit 208. The controller 200 may be a suitable DNP3 SCADA pack 100 controller from Control Microsystems, for example, or may be a bespoke design. Other controllers may be used in the control unit 108 and may employ the DNP3 communications protocol or another suitable communications protocol to perform functions of the controller 200 described herein. The transceiver unit 208 may be a NetComm NTC-6908 industrial 3G cellular network router, for example, or may be a bespoke design. The transceiver unit 208 may thus provide a point-to-point or point-to-multipoint communication capability in order to suitably interface with the remote server 210. The transceiver unit 208 may use a suitable domain name system (DNS) capability so that any subscriber identity module (SIM) in the transceiver unit 208 can be interchanged with another such SIM.

In some embodiments, the control unit 108 including the controller 200 and the transceiver unit 208 may be provided within a housing (not shown) and the transceiver unit 208 may include a transmitting and receiving antenna (not shown) concealed within the housing (not shown). In one embodiment, the housing (not shown) is formed of a suitable non-conductive material to allow sufficient signal transmission strength out of and in to the housing (not shown).

As shown in FIG. 2, the one or more servers 210 (referred to for convenience as "server 210") comprises a memory 212 and at least one processor 214 configured to execute program instructions or code 216 stored in the memory 212 to perform the methods disclosed herein.

The server 210 of the pressure sewer control system 104 may receive weather data from the weather forecasting system 128 across the communications network 110. For example, the weather forecasting system 128 may be arranged to transmit weather data to the server 210 periodically, or sporadically, and/or in response to a request for weather data. In some embodiments, the controller 200 may receive weather data via the transceiver unit 208 from the weather forecasting system 128 directly or indirectly, via the remote server 210 of the pressure sewer control system 104. For example, the weather forecasting system 128 and/or the pressure sewer control system 104 may be arranged to transmit weather data to the controller 200 periodically, or sporadically, and/or in response to a request for weather data.

The weather data may be stored in the memory 202 of the controller 200, the memory 212 of the server 210 and/or database 106. The weather data may comprise local or regional weather information and may relate to a geographical location of the pressure sewer installation(s) 102. The weather data may include past, current and/or forecasted weather information. The weather data may comprise information relating to sunshine, wind, temperature, rainfall, storms, river flows, etc. and any other suitable weather related data that may affect the power generating capability of the weather-dependent power generator and may be employed in estimating a power generating capability of the weather-dependent power generator for a time period.

Pressure sewer installation data which may comprise static data and dynamic data may be stored in the memory of the controller 200, the memory 212 of the server 210 and/or database 106. Static data may comprise a capacity of the sewerage tank 112, capacity of the battery 122, and/or potential energy harnessing capabilities of the weather-dependent power generator 120. Dynamic data may comprise fluid levels in the sewerage tank 112, sewerage tank usage history, sewerage tank filling history, current sewerage tank volume, current power stored in the battery 122, usage history of electrically power device(s) 126 and system health.

In some embodiments, the controller 200 of the control unit 108 of the pressure sewer installation 102 may be configured to upload pressure sewer installation data via the transceiver unit 208 to the server 210 of the pressure sewer control system 104 or may be provided to the pressure sewer control system 104 by any other suitable means, for example, by user input via a web browser running on a computing device such as one of devices 218. In some embodiments, the pressure sewer installation data may be uploaded by the controller 200 via the transceiver unit 208 to the database 106.

As shown in FIG. 2, the control unit 108 and/or the server 210 of the pressure sewer control system 104 may be in communication with one or more devices 218 across the communications network 110. The control units 108 and/or the server 210 may also be in communication with control units 220 of local sewerage collection systems 306 (FIG. 3) and control units 222 of the regional sewerage collection systems 308 (FIG. 3) across the communications network 108. For example, the control units 220 and/or control units 222 may be the same or substantially similar to the control unit 108.

FIG. 3 is an illustration of an example reticulated sewer network 300. The reticulated sewer network 300 may comprise a plurality of fluid conduits 302 to transport the sewerage to a suitable processing station 304. In some embodiments, each sewerage tank 112 of one or more pressure sewer installations 102 may be in fluid communication with a local sewerage collection system 306. Similarly, one or more local sewerage collection systems 306 may be in fluid communication with a regional sewerage collection system 308.

The local sewerage collection system 306 may comprise a control unit 220 for determining fluid levels in fluid reservoir(s) associated with the local sewerage collection systems 306 and transmitting local sewerage collection system data including fluid level indications to the remote server 210 of the pressure sewer control system 104, the control unit(s) 108 and/or database 106.

Similarly, the regional sewerage collection system 308 may comprise a control unit 222 for determining fluid levels in fluid reservoir(s) associated with the regional sewerage collection systems 308 and transmitting regional sewerage collection system data including fluid level indications to the remote server 210 of the pressure sewer control system 104, the control unit(s) 108 and/or database 106.

Figure 4:
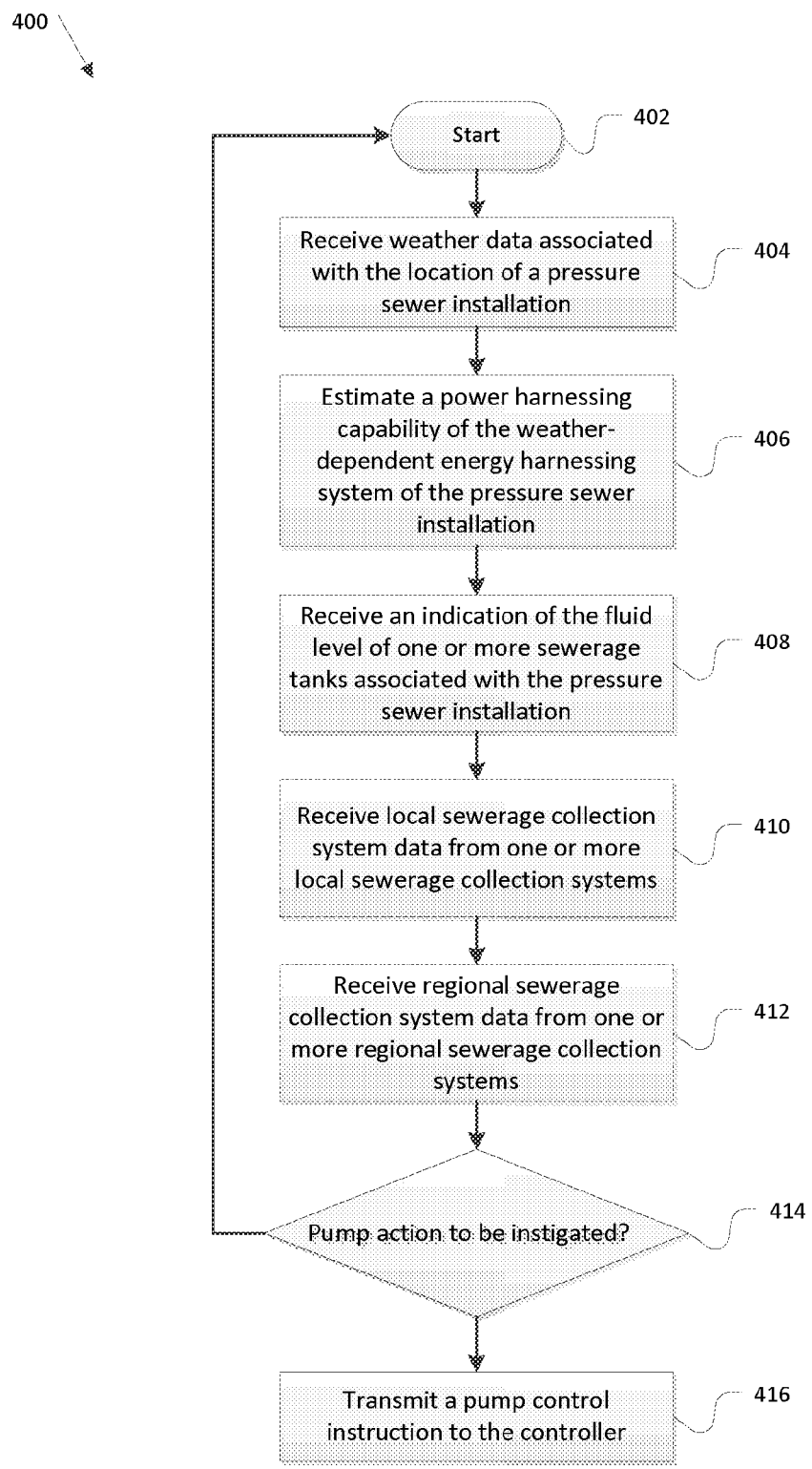
FIG. 4 is a process flow diagram of a computer-implemented method of controlling supply of power at one or more of the pressure sewer installations of FIG. 1, according to some embodiments, the method operable by the server of the pressure sewer control system FIG. 1.

Referring now to FIG. 4, there is illustrated a method 400 of controlling or managing supply of power at one or more pressure sewer installations 102 according to some embodiments, the method operable or implementable by the server 210 of the pressure sewer control system 104. In particular, the processor 214 of the server 210 is configured to execute the program instructions 216 stored in memory 212 in order to perform the method of FIG. 4.

The method starts at 402. The server 210 is configured to receive weather data associated with the location of weather-dependent power generator 120 or the pressure sewer installation 102 from the weather forecasting system 128, at 404. For example, the weather data may include recent, current and/or forecast weather information.

The server 210 is configured to estimate a power generating capability of the weather-dependent power generator 120 of the pressure sewer installation 102 for a period of time based on the weather data, at 406. For example, the period of time may comprise a number of hours or days. In some embodiments, the server 210 may employ static and/or dynamic pressure sewer installation data to estimate the power generating capability of the weather-dependent power generator 120. For example, the power generating capability of the weather-dependent power generator 120 may further depend on at least one of the capacity of the weather-dependent power generator 120, a potential power output of the weather-dependent power generator 120 and/or a capacity of the battery 122.

The server 210 is configured to receive pressure sewer installation data including an indication of the fluid level of one or more sewerage tanks 112 associated with the pressure sewer installation 102 from the controller 200 of the control unit 108 of the pressure sewer installation 102, at 408. In some embodiments, the pressure sewer installation data may further comprise an indication of the current battery power of the battery 122 and/or other static or dynamic pressure sewer installation data, as discussed above.

In some embodiments, the server 210 may be configured to receive local sewerage collection system data associated with one or more local sewerage collection systems 306 from one or more control units 220 associated with the local sewerage collection systems 306, at 410. For example, the local sewerage collection system data may include fluid level indications of one or more fluid reservoirs (not shown) associated with the local sewerage collection system 306 or an indication of the available storage of the local sewerage collection system 306.

In some embodiments, the server 210 may be configured to receive regional sewerage collection system data associated with one or more regional sewerage collection systems 308 from one or more control units 222 of the one or more regional sewerage collection systems 308, at 412. For example, the regional sewerage collection system data may include fluid level indications of one or more fluid reservoirs (not shown) associated with the regional sewerage collection system 308 or an indication of the available storage of the regional sewerage collection system 308.

The server 210 is configured to determine whether a pump action should be instigated by the controller 200 of the control unit 108 to pump fluid from the one or more sewage tanks 112 based on the estimated power generating capability of the weather-dependent power generator 120 and the indication of the fluid level of the one or more sewerage tanks 112 of the pressure sewer installation 102, at 414. For example, the controller 200 may execute a pump action by activating the pump 116 by supplying power to the pump 116. In some embodiments, the server 210 is configured to determine whether a pump action should be instigated by the controller 200 based on the estimated power generating capability of the weather-dependent power generator 120 and the indication of the fluid level of the one or more sewerage tanks 112 as well as the fluid level indications of one or more fluid reservoirs (not shown) associated with one or more the local sewerage collection systems 306 and/or the fluid level indications of one or more fluid reservoirs (not shown) associated with one or more regional sewerage collection systems 308.

In some embodiments, the determination of whether a pump action should be instigated by the controller 200 may be based on at least one or more of the following pump action determination criteria: a current volume in the sewerage tank 112; a typical fluid inflow profile of the sewerage tank 112; a predicted most likely time that the sewerage tank 112 reaches its functional capacity and requires pumping; a predicted most likely time that the sewerage tank 112 reaches a critical capacity that will cause overflow or spill if not pumped; available downstream capacity of the sewer network 300 to receive and accept the pumped fluid, for example, as described in International (PCT) Patent Application No. PCT/AU2012/000903, the entire content of which is incorporated herein by reference; available power generation capacity of the weather-dependent power generator 120; the available battery capacity of the battery 122; surplus/shortfall of power generation capacity of the weather-dependent power generator 120; surplus/shortfall of battery stored capacity; and predicted power demand of appliances or third party devices 126. In some embodiments, the pump action determination criteria may be determined by the server 210 based on static and/or dynamic pressure sewer installation data received from the pressure sewer installation 102, or stored in the memory 212 of the server 210 or database 106, and/or the weather data.

If the server 210 determines that a pump action should not be instigated by the controller 200, the method reverts to the start at 402.

If the server 210 determines that a pump action should be instigated by the controller 200 at 414, the server 210 is configured to transmit a pump control instruction to the controller 200 to cause the controller 200 to activate the pump 116 to discharge at least some of the stored fluid, at 416. For example, the controller 200 may activate the pump 116 by supplying or switching power to the pump 116.

In some embodiments, if the pump 116 fails to work and/or fluid cannot be discharged from the sewerage tank 112, the server 210 may receive an error message from the controller 200 and the server 210 may be configured to transmit an alarm message to a computing device 218 associated with an operator, such as a mobile phone, for example. In some embodiments, the controller 200 may be configured to transmit the alarm message directly to the computing device 218 associated with the operator.

Accordingly, the server 210 of the control system 104 may be configured to control supply of power at pressure sewer installations 102 of a network of pressure sewer installations 102 by issuing instructions to the controllers 200 of the control units 108 of the pressure sewer installations 102 to thereby cause the controller 200 to control a supply of power from the weather-dependent power generator 120 and/or the battery 122 to one or more pumps and/or other appliances 126.

Figure 5:
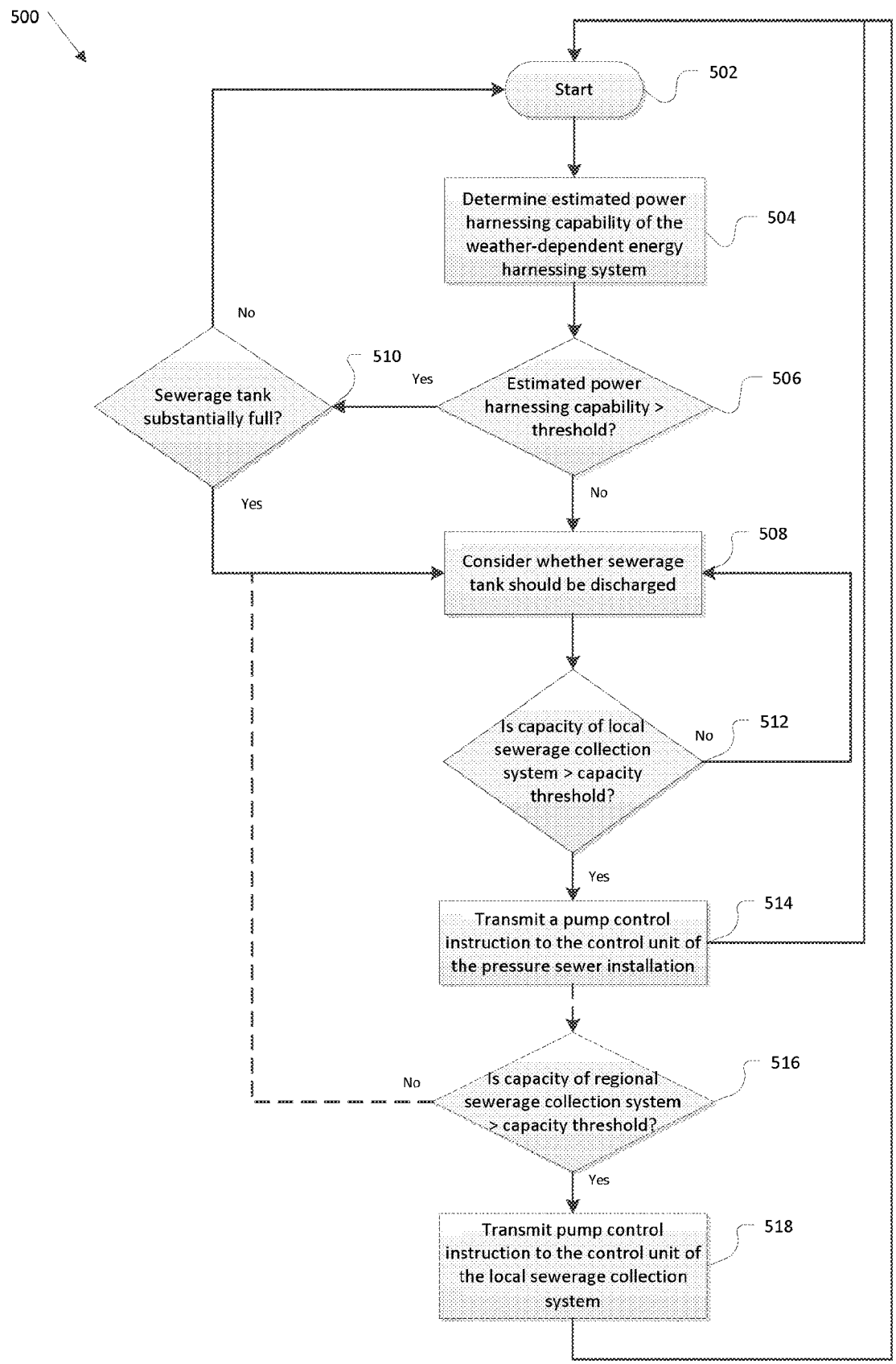
FIG. 5 is a process flow diagram of a computer-implemented method of determining whether a pump action should be instigated by a controller of the control unit of the pressure sewer installation according to some embodiments, the method operable by the server of the pressure sewer control system FIG. 1.

In some embodiments, the server 210 is configured to perform the exemplary method 500 of determining whether a pump action should be instigated by the controller 200 of the control unit 108 to pump fluid from the one or more sewage tanks 112, as depicted in the process flow diagram of FIG. 5. In particular, the processor 214 of the server 210 is configured to execute the program instructions 216 stored in memory 212 in order to perform the method of FIG. 5. In some embodiments, the method 500 may determine a suitable or optimum time to cause the controller 200 of the control unit 108 to pump fluid from the one or more sewage tanks 112.

The method 500 begins at 502. The server 210 is configured to determine, based on the weather data for the location or region associated with the weather-dependent power generator 120 and/or pressure sewer installation 102, an estimated power generating capability of the weather-dependent power generator 120 of the pressure sewer installation 102 for a period of time. For example, the period of time may comprise a number of hours or days such as the next 5 days.

The server 210 is configured to determine whether the estimated power generating capability exceeds a minimum threshold, at 506. If the server 210 determines that the estimated power generating capability of the weather-dependent power generator 120 is not greater than the minimum threshold, the server considers whether the one or more sewerage tanks 112 of the pressure sewer installation 102 should be discharged, at 508.

If the server 210 determines that the estimated power generating capability of the weather-dependent power generator 120 is greater than the minimum threshold, the server determines whether one or more sewerage tanks 112 of the pressure sewer installation 102 are full or substantially full, at 510. For example, a sewerage tank 112 may be considered full or substantially full if the fluid level in the sewerage tank 112 exceeds a fluid level threshold. If the server 210 determines at 510 that the one or more sewerage tanks 112 of the pressure sewer installation 102 are full or substantially full, the server considers whether the one or more sewerage tanks 112 of the pressure sewer installation 102 should be discharged, at 508.

If the server 210 determines at 510 that the one or more sewerage tanks 112 of the pressure sewer installation 102 are not full or substantially full, the server determines that a pump action should not be instigated by the controller 200 at 510 and the method reverts to the start at 502.

In some embodiments, the server 210 may be configured to determine whether the capacity of local sewerage collection system is greater than a capacity threshold, at 512. For example, the server 210 may be configured to determine whether fluid levels in the fluid reservoir(s) of the local sewerage collection system are less than a fluid level threshold.

If the server 210 determines the capacity of local sewerage collection system does not exceed a threshold, the method reverts to 508, and the server is configured to consider whether the one or more sewerage tanks 112 of the pressure sewer installation 102 should be discharged.

In some embodiments, if the server 210 determines that the capacity of the local sewerage collection system 306 is less than a local capacity threshold, such as a minimum threshold value, the server 210 may determine whether the capacity of the regional sewerage collection system is greater than a regional capacity threshold, such as a minimum threshold value, and if so, the server 210 may be configured to transmit a pump control instruction to the controller 200 of the control unit 108 of the pressure sewer installation 102 to cause the controller to discharge at least some of the fluid from the sewerage tank(s) 112 to the local sewerage collection system 306. This embodiment is based on the assumption that the local sewerage collection system 306 will be configured to soon discharge the fluid held in its fluid reservoir to the regional sewerage collection system in view of the fact that the fluid reservoir(s) of the local sewerage collection system 306 are substantially full but the regional sewerage collection system 308 has capacity to accommodate fluids received from local sewerage collection system 306. However, if the server 210 determines that the capacity of the regional sewerage collection system is less than a regional capacity threshold, such as a minimum threshold value, the method may revert to 508, and the server 210 may be configured again to consider whether the one or more sewerage tanks 112 of the pressure sewer installation 102 should be discharged.

If the server 210 determines the capacity of the local sewerage collection system 306 is greater than a threshold, the server 210 is configured to transmit a pump control instruction to the controller 200 of the control unit 108 of the pressure sewer installation 102 to cause the controller to discharge at least some of the fluid from the sewerage tank(s) 112 at 514. In some embodiments, the method 500 may then revert to the start at 502.

In some embodiments, the server 210 may be configured to determine whether a capacity of the regional sewerage collection system 308 is greater than a threshold, i.e., whether the regional sewerage collection system 308 has capacity to receive fluid from the local sewerage collection system 306, at 516, and if the server 210 determines that the capacity is greater than a regional capacity threshold, at 518, the server 210 may be configured to transmit a pump control instruction to the control unit 220 of the local sewerage collection system 306 to cause the control unit 220 to discharge at least some of the fluid from the fluid reservoir(s) of the local sewerage collection system 306, at 518. The method 500 may then revert to the start at 502. If the server 210 determines that the capacity is not greater than a regional capacity threshold, the method may revert to 508, and the server 210 may be configured again to consider whether the one or more sewerage tanks 112 of the pressure sewer installation 102 should be discharged.

The control or power management system 104 may therefore be configured to employ the methods 400 and/or 500 to balance demands of present and future power capacity of one or more pressure sewer installations with capacity demands of an associated sewer network 300 and to smooth peak demands of a network of pressure sewer installations 102. For example, the estimated power harnessing capability may be employed in determining suitable threshold values or pump start/stop set points, such as, fluid level thresholds, for storing in the memory of the control unit 108 for controlling operations of the pump 116, as discussed in International (PCT) Patent Application No. PCT/AU2012/000903. In this way, the control system 104 is provided with greater flexibility in selecting a suitable threshold value, allowing for more effective management and truncation of peak flows. Furthermore, operations of neighbouring pressure sewer installations 102 may be considered and taken into account in determining the suitable threshold level for a particular pump control system.

In some embodiments, the server 210 of the pressure sewer control system 104 may be configured to implement a method of controlling supply of power at one or more pressure sewer installations 102, for example, where the power is generated by a weather-dependent power generator 120, which involves only some of the steps of method 400. In particular, the server 210 may be configured to receive weather data associated with the location of a weather-dependent power generator 120 and/or a pressure sewer installation 102 from the weather forecasting system 128 and to estimate a power generating capability of the weather-dependent power generator 120 of the pressure sewer installation 102 for a period based on the weather data, as per steps 404 and 404 of method 400. The server 210 may be then configured to determine, based on the estimated power generating capability of the weather-dependent power generator 120, whether available power from the weather-dependent power generator 120 and/or battery 122 should be retained and stored for later consumption or be made available for powering the pump 116 and/or other devices 126 associated with the pressure sewer installation 102. In some embodiments, the server 210 may further base the determination on the predicted use of the pumps 116 and/or other devices 126. For example, the predicted use may be based on pressure sewer installation data, such as historical use data. The server 210 may be configured to issue a command to the controller 200 of the control unit 208 to instruct the controller 200 to allow/disallow supply of power from the weather-dependent power generator 120 and/or battery 122 to the pumps 116 and/or devices 126.

Figure 6:
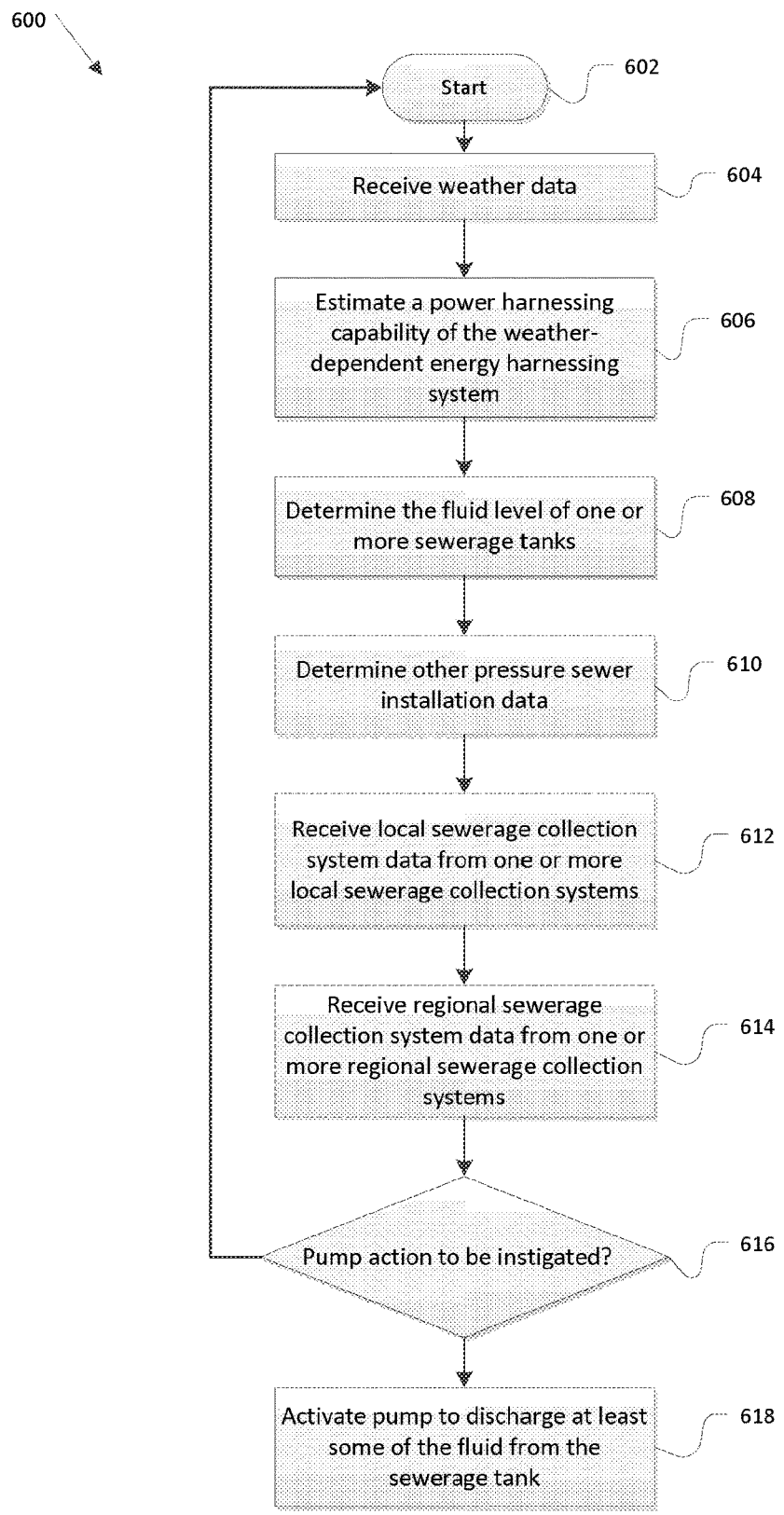
FIG. 6 is a process flow diagram of a computer-implemented method of controlling supply of power at one or more of the pressure sewer installations of FIG. 1, according to some embodiments, the method operable by a controller of a control unit of the pressure sewer installation of FIG. 1.

Referring now to FIG. 6, there is illustrated a method 600 of controlling or managing power supply at pressure sewer installations 102 according to some embodiments, the method operable or implemented by the controller 200 of the control unit 108 of the pressure sewer installation 102. In particular, the processor 204 of the controller 200 is configured to execute the program instructions 206 stored in memory 202 in order to perform the method of FIG. 6.

The method starts at 602. The controller 200 receives weather data associated with the pressure sewer installation via the transceiver 208 of the control unit 108, at 604. For example, the controller 200 may receive the weather data from the remote server 210 of the control system 104 or the weather forecasting system 128.

The controller 200 is configured to estimate power generating capability of the weather-dependent power generator 120 for a period of time based on the weather data, at 606. For example, the period of time may comprise a number of hours or days, such as 5 days. In some embodiments, the controller 200 may employ static and/or dynamic pressure sewer installation data to estimate the power generating capability of the weather-dependent power generator 120. For example, the power generating capability of the weather-dependent power generator 120 may further depend on at least one of the capacity of the weather-dependent power generator 120, a potential power output of the weather-dependent power generator 120 and/or a capacity of the battery 122.

The controller 200 determines a fluid level of the at least one sewerage tank 112, at 608. For example, the controller 200 may receive signals indicative of fluid levels in the one or more sewerage tanks 112 from sensors 118.

In some embodiments, the controller 200 may be configured to determine other pressure sewer installation data, such as static or dynamic pressure sewer installation data at 610. The pressure sewer installation data may be stored locally, in memory 202 of the control unit 108 and/or may be stored remotely at the remote server 210 and/or database 106, in which case, the controller 200 may be configured to retrieve pressure sewer installation data from the remote server 210 and/or database 106.

In some embodiments, the controller 200 may be configured to receive local sewerage collection system data associated with one or more local sewerage collection systems 306 from one or more control units 220 associated with the local sewerage collection systems 306, at 612. For example, the local sewerage collection system data may include fluid level indications of one or more fluid reservoirs (not shown) associated with the local sewerage collection system 306 or an indication of the available storage of the local sewerage collection system 306.

In some embodiments, the controller 200 may be configured to receive regional sewerage collection system data associated with one or more regional sewerage collection systems 308 from one or more control units 222 of the one or more regional sewerage collection systems 308, at 614. For example, the regional sewerage collection system data may include fluid level indications of one or more fluid reservoirs (not shown) associated with the regional sewerage collection system 308 or an indication of the available storage of the regional sewerage collection system 308.

The controller 200 is configured to determine whether to instigate a pump action to cause the pump 116 to discharge fluid from the one or more sewerage tanks 112 of the pressure sewer installation 102, at 616. The determination of whether or not to instigate a pump action is based on the estimated power generating capability of the weather-dependent power generator 120 and the fluid level of the at least one sewerage tank 112.

In some embodiments, the determination of whether or not to instigate a pump action may be further based on other pressure sewer installation data, such as the current amount of energy stored in the battery 122 and/or historical data associated with the pressure sewer installation, for example.

In some embodiments, the determination of whether or not to instigate a pump action may be further based on the local sewerage collection system data and/or the regional sewerage collection system data.

In some embodiments, the determination of whether a pump action should be instigated may be based on at least one or more of the pump action determination criteria described above.

The controller 200 may be configured to activate the pump 116 to discharge at least some of the fluid from the one or more sewerage tanks 112 of the pressure sewer installation 102, at 618.

In some embodiments, if the pump 116 fails to work and/or fluid cannot be discharged from the sewerage tank 112, the controller 200 may be configured to transmit an alarm message to a computing device 218 associated with an operator, such as a mobile phone, for example.

Accordingly, the controller 200 of the pressure sewer installation may be configured to control supply of power at the pressure sewer installation 102 by controlling a supply of power from the weather-dependent power generator 120 and/or the battery 122 to one or more pumps and/or other appliances 126.

In some embodiments, the controller 200 may be configured to perform steps 502 to 512 and 516 to 518 of the exemplary method 500 of determining whether a pump action should be instigated by the controller 200 of the control unit 108 to pump fluid from the one or more sewage tanks 112, as depicted in the process flow diagram of FIG. 5. As opposed to performing step 514, the controller 200 may be configured instead to cause the pump 116 to discharge fluid from the one or more sewerage tanks 112 of the pressure sewer installation 102. In particular, the processor 204 of the controller 200 is configured to execute the program instructions 206 stored in memory 202 in order to perform the method of FIG. 5.

In some embodiments, the controller 200 of the control unit 108 of the pressure sewer installation 102 may be configured to implement a method of controlling supply of power at one or more pressure sewer installations 102, for example, where the power is generated by a weather-dependent power generator 120, which involves only some of the steps of method 600. In particular, the controller 200 may be configured to receive weather data associated with the pressure sewer installation and/or weather-dependent power generator 120 via the transceiver 208 of the control unit 108 and to estimate power generating capability of the weather-dependent power generator 120 for a period of time based on the weather data, as per steps 604 and 606 of method 600. The controller 200 may be then configured to determine, based on the estimated power generating capability of the weather-dependent power generator 120, whether available power from the weather-dependent power generator 120 and/or battery 122 should be retained and stored in battery 122 for later consumption or be made available for powering the pump 116 and/or other devices 126 associated with the pressure sewer installation 102. In some embodiments, the controller 200 may further base the determination on the predicted use of the pumps 116 and/or other devices 126. For example, the predicted use may be based on pressure sewer installation data, such as historical use data. The controller 200 may be configured to allow/disallow supply of power from the weather-dependent power generator 120 and/or battery 122 to the pumps 116 and/or devices 126.

It will be appreciated that the systems and methods disclosed herein need not be limited to use with pressure sewer installations. In some embodiments, the control system 104 may be configured to control supply of power generated by a weather-dependent power generator 120 to one or more electrically powered devices 126 or appliances. The control system 104 may be configured to determine instructions for controlling a supply of power generated by the weather-dependent power generator 120 based on an estimated power generating capability of the weather-dependent power generator 120. As with method 400 depicted in FIG. 4, the server 210 of the control system 104 may be configured to receive weather data for a region associated with the weather-dependent power generator 120, for example, from the weather forecasting system 128 and to estimate the power generating capability of the weather-dependent power generator 120 based on the weather data. The control system 104 may issue instructions to the controller 200 of a control unit 108 to thereby cause the controller 200 to control the supply of power from the weather-dependent power generator and/or the battery to the one or more electrically powered devices 126 or appliances. In some embodiments, the one or more electrically powered device 126 may comprise a control mechanism (not shown) for controlling the discharge of fluid from a reservoir (not shown), such as a water tank. For example, the control system 104 may be configured to determine instructions for controlling a supply of power generated by a weather-dependent power generator 120 to the control mechanism (not shown) and the instructions for controlling the supply of power may be further based on a fluid level of fluid in the reservoir (not shown).

In some embodiments, the control unit 108 may be configured to control supply of power generated by a weather-dependent power generator 120 to one or more electrically powered devices 126 or appliances. As with method 600 depicted in FIG. 6, the controller 200 of the control unit 108 may be configured to receive weather data for a region associated with the weather-dependent power generator 120, for example, from the weather forecasting system 128 and to estimate the power generating capability of the weather-dependent power generator 120 based on the weather data. The controller 200 may determine whether or not to allow power to be supplied to the one or more electrically powered devices 126 or appliances based on the estimated power generating capability of the weather-dependent power generator 120. In some embodiments, the one or more electrically powered devices 126 may comprise a control mechanism (not shown) for controlling the discharge of fluid from a reservoir (not shown), such as a water tank. For example, the control unit 108 may be configured to determine instructions for controlling a supply of power generated by a weather-dependent power generator 120 to the control mechanism (not shown) and the instructions for controlling the supply of power may be further based on a fluid level of fluid in the reservoir (not shown).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A pressure sewer control system comprising a server in communication with a plurality of pressure sewer installations across a communications network, each of the plurality of pressure sewer installations comprising a controller and one or more sewerage tanks, the server configured to:
   determine weather data for a region associated with each pressure sewer installation;
   estimate power generating capability of a weather-dependent power generator of each pressure sewer installation for a time period based on the weather data;
   receive fluid level data indicative of a fluid level in the one or more sewerage tanks from the controller;
   determine whether a pump action should be instigated by the controller to pump fluid, at a certain time, from the one or more sewerage tanks based on the estimated power generating capability of the weather-dependent power generator and on a predicted use of the pump action based on the fluid level data and historical use data of the one or more sewerage tanks so as to smooth peak demands of a network of the pressure sewer installations without causing an overflow of the one or more sewerage tanks; and
   transmit a pump control instruction to the controller to cause the controller to activate the pump in response to determining that a pump action should be instigated by the controller,
   wherein the controller is configured to control supply of power generated by the weather-dependent power generator to the pump.

2. The pressure sewer control system of claim 1, wherein the weather data comprises past, current and/or forecasted weather information.

3. The pressure sewer control system of claim 1, wherein the server is configured to determine whether a pump action should be instigated by the controller to pump fluid from the one or more sewerage tanks further based on additional pressure sewer installation data.

4. The pressure sewer control system of claim 3, wherein the additional pressure sewer installation data comprises one or more of a capacity of the one or more sewerage tanks; capacity of a battery associated with the weather-dependent power generator; potential energy harnessing capabilities of the weather-dependent power generator; filling history of the one or more sewerage tanks; current volume of the one or more sewerage tanks; current power stored in a battery associated with the weather-dependent power generator; electrically powered device usage history; and system health.

5. The pressure sewer control system of claim 1, wherein the server is configured to determine whether a pump action should be instigated by the controller to pump fluid from the one or more sewerage tanks further based on at least one or more of the following pump action determination criteria: a typical fluid inflow profile of the one or more sewerage tanks; a predicted most likely time that the one or more sewerage tanks reach a functional capacity and require pumping; a predicted most likely time that the one or more sewerage tanks reach a critical capacity that will cause overflow or spill if not pumped; available downstream capacity of a sewer network to receive and accept the pumped fluid; available power generation capacity of the weather-dependent power generator; available battery capacity of a battery associated with the weather-dependent power generator; determined surplus/shortfall of power generation capacity of the weather-dependent power generator; determined surplus/shortfall of battery stored capacity; and predicted power demand of appliances or third party devices.

6. The pressure sewer control system of claim 1, wherein the server is configured to transmit an alarm message to a computing device associated with an operator in response to determining that a pump action cannot be instigated by the controller.

7. The pressure sewer control system of claim 1, wherein the server is configured to determine that a pump action should be instigated by the controller in response to determining that the estimated power generating capability exceeds a power threshold and that the one or more sewerage tanks are substantially full.

8. The pressure sewer control system of claim 1, wherein the server is further configured to receive local sewerage collection system data associated with one or more local sewerage collection systems from one or more control units associated with the local sewerage collection systems, wherein the local sewerage collection system data comprises available capacity of one or more fluid reservoirs of the local sewerage collection system, and wherein the server is configured to determine whether a pump action should be instigated by the controller to pump fluid from the one or more sewerage tanks further based on the available capacity of the local sewerage collection systems.

9. The pressure sewer control system of claim 1, wherein the server is further configured to receive regional sewerage collection system data associated with one or more regional sewerage collection systems from one or more control units associated with the regional sewerage collection systems, wherein the regional sewerage collection system data comprises available capacity of one or more fluid reservoirs of the regional sewerage collection system, and wherein the server is configured to determine whether a pump action should be instigated by the controller to pump fluid from the one or more sewerage tanks further based on the available capacity of the regional sewerage collection systems.

10. A method of controlling supply of power generated by a weather dependent power generator at a plurality of pressure sewer installations, the method operable by a pressure sewer control system comprising a server in communication with the plurality of pressure sewer installations across a communications network, each of the plurality of pressure sewer installations comprising a controller and one or more sewerage tanks, the method comprising:
  determining weather data for a region associated with each pressure sewer installation;
    estimating power generating capability of the weather-dependent power generator of each pressure sewer installation for a time period based on the weather data;
  receiving fluid level data indicative of a fluid level in the one or more sewerage tanks from the controller;
  determining whether a pump action should be instigated by the controller to pump fluid, at a certain time, from the one or more sewerage tanks based on the estimated power generating capability of the weather-dependent power generator and on a predicted use of the pump action based on the fluid level data and historical use data of the one or more sewerage tanks so as to smooth peak demands of a network of the pressure sewer installations without causing an overflow of the one or more sewerage tanks; and
  transmitting a pump control instruction to the controller to cause the controller to activate the pump in response to determining that a pump action should be instigated by the controller, wherein the controller is configured to control supply of power generated by the weather-dependent power generator to the pump.

11. The method of claim 10, comprising determining that a pump action should be instigated by the controller in response to determining that the estimated power generating capability exceeds a power threshold and that the one or more sewerage tanks are substantially full.

12. The method of claim 10, comprising receiving local sewerage collection system data associated with one or more local sewerage collection systems from one or more control units associated with the local sewerage collection systems, wherein the local sewerage collection system data comprises available capacity of one or more fluid reservoirs of the local sewerage collection system, and determining whether a pump action should be instigated by the controller to pump fluid from the one or more sewerage tanks further based on the available capacity of the local sewerage collection systems.

13. The method of claim 10, comprising determining that a pump action should be instigated by the controller in response to determining that the estimated power generating capability exceeds a power threshold, that the one or more sewerage tanks are substantially full, and the available capacity of the local sewerage collection system is greater than a local sewerage collection system capacity threshold.

14. The method of claim 10, comprising receiving regional sewerage collection system data associated with one or more regional sewerage collection systems from one or more control units associated with the regional sewerage collection systems, wherein the regional sewerage collection system data comprises available capacity of one or more fluid reservoirs of the regional sewerage collection system, and determining whether a pump action should be instigated by the controller to pump fluid from the one or more sewerage tanks further based on the available capacity of the regional sewerage collection systems.

* * * * *